July 7, 1959  
J. W. NAPEROLA  
2,893,292  
DEVICE FOR REMOVING THE EXCESS WELDING BEAD FROM THE EXTERIOR SURFACE OF WELDED SEAM TUBING  
Filed Dec. 26, 1957
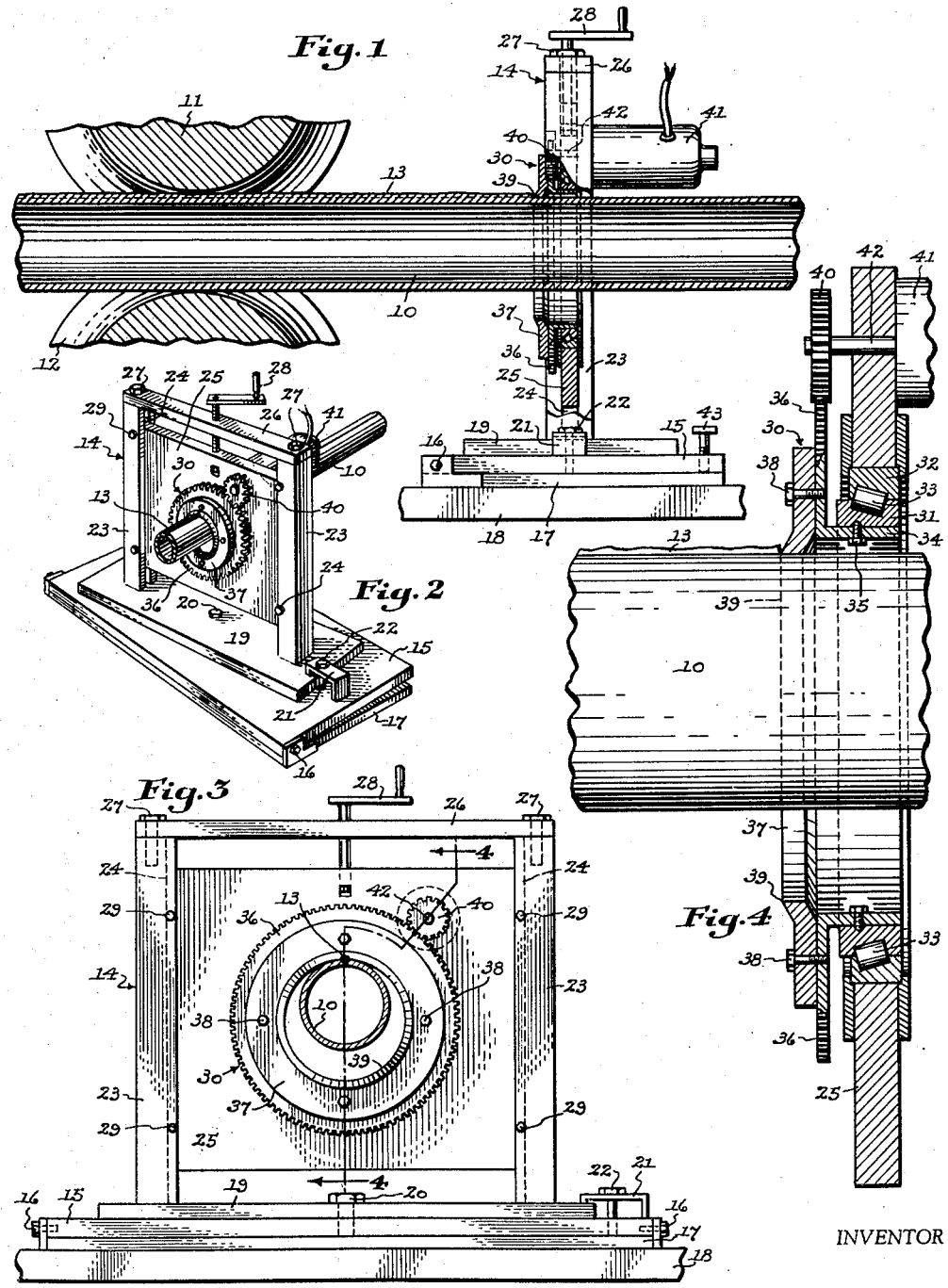
WITNESS  
Harry S. Brown Jr.
INVENTOR  
Joseph W. Naperola  
BY  
John S. Braddock  
ATTORNEY

United States Patent Office 2,893,292
Patented July 7, 1959

2,893,292

DEVICE FOR REMOVING THE EXCESS WELDING BEAD FROM THE EXTERIOR SURFACE OF WELDED SEAM TUBING

Joseph W. Naperola, Grand Rapids, Mich.

Application December 26, 1957, Serial No. 705,154

2 Claims. (Cl. 90—24)

The present invention relates to the manufacture of welded seam metal tubing.

In the manufacture of welded seam tubing from strip stock on a tube rolling mill, the welding operation leaves an excess welding bead on the exterior surface of the tubing along the seam. In conventional practice, a fixed cutting knife is mounted adjacent the tubing where it emerges from the mill, for cutting off the excess welding bead. At this point, the tubing is still hot from the welding operation and additional heat is generated by the cutting operation, so that the cutting knife is subjected to heat of such intensity that it quickly erodes and requires frequent replacement.

The primary objects of the present invention are to provide an improved device for removing the excess welding bead from the exterior surface of welded seam tubing; to provide such a device in which the cutting knife for removing the bead seldom if ever requires replacement; to provide such a device in which the knife is in the form of a rotating cutter ring through which the tubing passes as it emerges from the mill, the cutter ring having an internal cutting edge which tangentially contacts the tubing at the seam thereof, and the arrangement being such that as the cutter ring rotates it constantly presents a different cutting edge to the tubing while he remainder of the circular cutting edge is cooling off during the cutter ring's rotation; to provide such a device in which is incorporated adjustment features to accommodate it to tubing of different diameters; and in general to provide such a device which is efficient in operation and economical both in manufacture and maintenance.

An illustrative embodiment of the invention is shown in the accompanying drawings, wherein:

Figure 1 is a view, partly in side elevation and partly in vertical section, of the new device, and showing a section of welded seam tubing emerging from a tube rolling mill, shown fragmentarily, and passing through the device for removal of the excess welding bead therefrom;

Figure 2 is a perspective view of the same;

Figure 3 is an end elevational view of the same, the tubing passing through the device being shown in vertical cross-section; and Figure 4 is an enlarged, fragmentary vertical sectional view of parts thereof, the plane of section being indicated by the line 4—4 of Figure 3.

Referring now in detail to this drawing, Figure 1 shows a section of welded seam tubing 10 as it emerges from rolls 11, 12 of a tube rolling mill. The welded seam is shown at the top of the tubing 10, and the excess welding bead along the seam is designated 13. The device comprises a rectangular frame generally designated 14 mounted on a base 15 which is pivotally connected by pins 16 to a sub-base 17, and the sub-base 17 is mounted by any suitable means on a supporting element 18 which may be an extension of the bed of the rolling mill.

The frame 14 comprises a bottom plate 19 which is turnably adjustably secured to the base 15 by means of a centrally located screw 20. A bracket 21 mounted on the base 15 by means of a screw 22 is provided for securing the bottom plate 19 in adjustably turned position. The frame 14 also comprises vertical posts 23 which have mutually inwardly opening vertical grooves 24 in which is vertically slidably mounted a block 25, and the upper ends of the posts 23 are connected by a cross-bar 26 secured to the posts by means of screws 27. Vertical adjustment of the block 25 in the grooves 24 of posts 23 can be effected by means of a hand crank 28 journalled in the frame's cross-bar 26 and threaded into the upper end of the block 25. Screws 29 are provided in the posts 23 for securing the block 25 in vertically adjusted position.

The block 25 has a central circular opening in which is rotatably mounted the cutter ring which is generally designated 30. The cutter ring comprises three annular elements: a bearing element 31 (see Figure 4) rotatably disposed in a bearing ring 32 secured in the block's central opening with roller bearings 33 interposed between the bearing ring 32 and bearing element 31; a gear element 34 secured to the bearing element 31 by means of screws 35 and having an external peripheral gear-wheel 36 thereon; and a knife element 37 secured to the gear element 34 by means of screws 38 and having a circular knife edge 39.

A pinion 40 is mounted on the block 25 for rotating movement meshing with the cutter ring's gear-wheel 36, and an electric motor 41 is also mounted on the block 25 and operatively connected to the pinion 40 by means of a shaft 42.

Operation

The device is first adjusted to the work. These adjustments are: (1) Vertical sliding adjustment of the block 25 relative to the tubing 10 so that a tangential contact is made between the circular cutting edge 39 of the cutter ring 30 and the upper edge of the tubing 10 adjacent the seam thereof; (2) turning adjustment of the frame 14 about the screw 20 which provides an axis perpendicular to the tangential contact of the cutter ring 30 with the tubing 10, so as to match the effective arc of the cutting knife to the curvature of the tubing; and (3) tilting adjustment of the base 15 on the sub-base 17 to effect the optimum shearing action of the circular cutting knife to remove the excess welding bead 13 from the tubing 10. This latter adjustment is made by means of an adjustment screw 43 (see Figure 1) threaded in the base 15 and bearing against the sub-base 17.

It will readily be seen that as the circular cutter ring 30 rotates to shear the excess welding bead off the tubing 10 passing therethrough, the cutting edge 39 of the circular knife element 37 is permitted to cool off, thus always presenting to the tubing a cool edge at the tangential point of cutting. While in the preferred form of the invention the cutter ring 30 is mounted for continuous rotary movement, the invention also contemplates a reciprocating or oscillating rotary movement of the cutter ring. Should the cutting edge 39 of the circular knife element 37 become chipped in use or by accident, the motor 41 can be stopped so that the knife will function for a time in the same manner as a conventional fixed knife.

While but one specific embodiment of the invention has been herein shown and described, it will be understood that numerous details of construction thereof may be altered or omitted without departing from the spirit of the invention as the same is defined by the following claims.

What I claim is:

1. A device for removing the excess welding bead from the exterior surface of welded seam tubing as the tubing emerges from a tube rolling mill comprising a frame disposed transverse to the longitudinal path of the tubing with the tubing passing through the frame, a block mounted in the frame and having an opening formed therethrough through which the tubing passes, a cutter ring of greater diameter than the tubing mounted in said opening, said cutter ring having a substantially circular internal cutting edge adapted to contact the tubing tangentially adjacent the seam thereof for progressively removing the welding bead from the tubing, said cutter ring being rotatably supported by said block, means for continuously rotating said cutter ring during operation of the device, said block being slidably mounted in said frame for vertical adjustment relative thereto to provide tangential contact of the cutting edge of the cutter ring with the seams of tubing of different diameters, means mounting said frame for turning adjustment about an axis perpendicular to the point of tangential contact of the cutter ring with the tubing so as to match the effective arc of the cutting knife to the curvature of the tubing, and means mounting the frame for tilting movement to effect the optimum shearing action of the cutting edge of the cutter ring to remove the excess welding bead.

2. A device as defined in claim 1 wherein the cutter ring is provided with an external peripheral gear wheel, and the means for rotating said cutter ring comprises a pinion mounted on the block for rotary movement and meshing with said gear wheel, and a motor mounted on the block and operatively connected to the pinion.

References Cited in the file of this patent
UNITED STATES PATENTS

| | | |
|---|---|---|
| 1,306,533 | Friel | June 10, 1919 |
| 2,608,138 | Tener et al. | Aug. 26, 1952 |